US007762177B2

(12) United States Patent
Fischer

(10) Patent No.: US 7,762,177 B2
(45) Date of Patent: Jul. 27, 2010

(54) HYDRAULIC CYLINDER UNIT

(75) Inventor: Marcus Fischer, Bietigheim-Bissingen (DE)

(73) Assignee: Weber-Hydraulic GmbH, Gueglingen (DE)

(*) Notice: Subject to any disclaimer, the term of this patent is extended or adjusted under 35 U.S.C. 154(b) by 38 days.

(21) Appl. No.: 11/408,681

(22) Filed: Apr. 20, 2006

(65) Prior Publication Data

US 2006/0272498 A1 Dec. 7, 2006

(30) Foreign Application Priority Data

Apr. 20, 2005 (DE) ....................... 10 2005 018 442

(51) Int. Cl.
*F16J 15/24* (2006.01)
*F16J 9/06* (2006.01)

(52) U.S. Cl. ........................................ 92/168; 277/468

(58) Field of Classification Search .................. 92/168; 277/468

See application file for complete search history.

(56) References Cited

U.S. PATENT DOCUMENTS 2,349,170 A * 5/1944 Jackman ..................... 92/168
4,566,703 A * 1/1986 Zitting ....................... 277/468
5,921,166 A * 7/1999 Machida et al. ............... 92/168
2004/0164496 A1* 8/2004 Okada et al. ................ 277/549

FOREIGN PATENT DOCUMENTS

DE 195 26 783 1/1997
DE 197 17 652 11/1997

OTHER PUBLICATIONS

XP-002475214, "Merkel U-Rings made of PTFE", Merkel Hydraulics: Rod Seals, Fruedenberg Simrit KG, pp. 3a51-20.14.

* cited by examiner

*Primary Examiner*—F. Daniel Lopez
(74) *Attorney, Agent, or Firm*—Jordan and Hamburg LLP

(57) ABSTRACT

A hydraulic cylinder unit is provided with a rod seal and/or piston seal which has a surface that deviates from the vertical circular cylindrical surface of the piston head throughhole through which the piston rod passes or the vertical circular cylindrical surface of the cylinder interior while forming respective converging gaps with regard to the rod surface and the interior surface of the cylinder, respectively.

14 Claims, 2 Drawing Sheets

HYDRAULIC CYLINDER UNIT

BACKGROUND OF THE INVENTION

The invention relates to a hydraulic cylinder unit, specifically a hydraulic cylinder unit with a cylinder tube having an inner surface with a piston that is guided thereon and that has an outer surface, with a piston rod joined thereto whose rod surface is guided on a cylinder head that closes the rod-side cylinder space, with at least one rod seal arranged therein that seals the piston rod-side cylinder space from the area of the cylinder unit between the rod surface and the cylinder head by means of a rotationally symmetrical inner seal surface, and with at least one piston seal arranged in the piston that seals the piston-rod side cylinder space and the cylinder space formed by the cylinder floor and the piston between the cylinder space inner surface and the outer surface of the piston by means of a rotationally symmetrical outer seal surface.

Especially low-friction cylinder units are of interest for various purposes. Among these are cylinders for suspension and steering functions, or working cylinders subject to high demands in terms of sensitivity and positionability. The effect of increased friction is a poor ratio of effective force, that is working force of the cylinder, to theoretical pressure force. Among other things, this leads to the fact that the cylinder must be designed larger than theoretically necessary in order to provide adequate effective force.

In suspension cylinders, the frictional force acts like additional damping. However, the greater the basic damping of the cylinder itself, the lower the portion that can be effectively influenced in the control. However, it is precisely the option for influencing damping that is the basis for a modem, active suspension and damping system.

In addition to relatively high friction, the ratio of static friction to sliding friction is also of interest because major differences between the two values can lead to undesired oscillations or vibrations (so-called stick/slip effect).

Finally, unsatisfactory friction values and relatively wide variance of known hydraulic cylinder units in series are also disadvantageous.

The object of the invention is therefore to design a hydraulic cylinder unit such that it is particularly low in friction.

SUMMARY OF THE INVENTION

This object is inventively attained in a hydraulic cylinder unit in accordance with the invention in that the rod seal and/or piston seal (hereinafter referred to as seal) has, at least by region, on its inner and outer seal surfaces (hereinafter seal surfaces) a shape that deviates from the surface of a vertical circular cylinder while forming a converging gap with regard to the rod surface and the inner surface of the cylinder tube.

The inventively provided rotationally symmetrical rod seal thus is in contact along a circumferential closed line, hereinafter referred to as the inner equator, on its inner seal surface with the outer surface of the piston, and/or the likewise rotationally symmetrically embodied piston seal is thus in contact along a likewise circumferential closed line, hereinafter referred to as the outer equator, on its outer seal surface with the inner surface of the cylinder tube. The line can also form a certain width while creating a circumferential contacting surface. Thus, as the distance from the equator to the gaps converging in the direction of the equator decreases, the free cross-section of the gaps for the passage of the displaced hydraulic fluid preferably grows increasingly smaller. In this, the shape of the region that is adjacent to each gap and that deviates from the shape of the surface of a vertical circular cylinder can be embodied curved not only as a result of its rotational symmetry in the circumferential direction but also in the axial direction. However, a gap embodied in a wedge-shape without additional curvature is also possible.

The inventive principle thus utilizes the hydrodynamic effect of the hydraulic liquid in the converging gap in order to minimize the frictional forces between preferably the piston seal and the cylinder tube on the one hand and the rod seal and the piston rod on the other hand. Although the qualities of the running surface (roughness, material, surface treatment) are not the subject of the invention, it must be embodied such that, in combination with the running surface (inner surface of the cylinder tube or outer surface of the piston rod), with the seal it ensures optimum friction and wear behavior.

It has been found that the frictional force or damping properties of the hydraulic cylinder unit in accordance with the invention can be substantially reduced by using the piston seal and/or rod seal. Numerous possibilities and advantages result from this. Thus, the reduction in the size of the cylinder due to improved force utilization can lead to more numerous employment possibilities and to savings in costs. Furthermore, the improvement in the properties of suspension cylinders, due to reduced basic damping, leads to the fact that a greater portion is available for actively influencing system damping. In working cylinders, controllability and sensitivity can be markedly enhanced. In addition, new areas of application become available for the inventive cylinder units for cylinders that were previously not suitable due to inadequate effective force, frictional forces and thus interfering forces that were too high, or damping that was too high. Double-acting cylinders can also act as the hydraulic cylinder unit.

In one advantageous embodiment of the invention, the piston seal has two largely wedge-shaped gaps that deviate from the surface of a vertical circular cylinder, of which the one gap is open to the cylinder space and the other is open to the rod-side cylinder space.

In accordance with the invention, the gap for the rod seal is embodied asymmetrical with respect to its center plane and open to the piston rod-side cylinder space so that at least in the outward-moving direction of the piston rod the hydrodynamic friction-reducing floating effect results.

If in addition an additional seal is arranged between the rod seal and the area of the cylinder unit and between it and the rod seal a recess acting as a reservoir for the hydraulic fluid that is carried out is arranged in the cylinder head, the extra hydraulic fluid carried out as a lubricating film can be collected there and the hydrodynamic friction-reducing floating effect can also be produced in the inward-moving direction of the piston rod.

One exemplary embodiment of the invention is explained in greater detail in the following, with reference to the drawings.

DETAILED DESCRIPTION OF THE INVENTION

Figure 1:
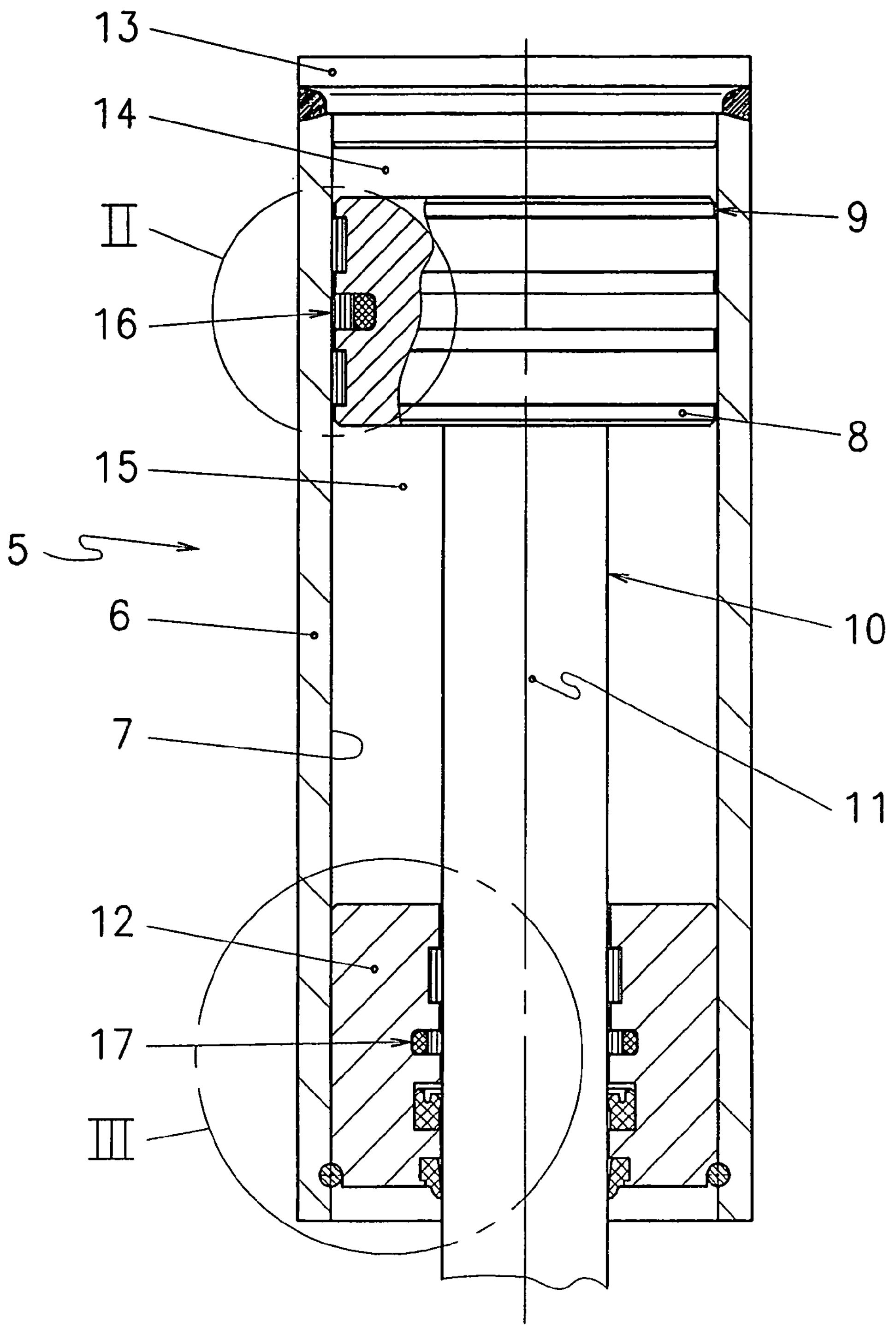
FIG. 1 depicts a schematic section through a cylinder unit, in partial break-away.

The cylinder unit illustrated in FIG. 1 and labeled 5 overall has a cylinder tube 6 on whose inner surface 7 a piston 8 having an outer surface 9 is guided. On the piston, a piston rod, labeled 10 overall, is joined to a rod surface 11 that extends out of the cylinder unit 5 via a cylinder head labeled 12 overall that is driven out when hydraulic fluid that is under pressure acts upon the cylinder space 14 that is formed between the piston 8 and the cylinder floor 13. If the cylinder unit 5 is embodied with double action, pressure can also act on the annular piston rod-side cylinder space 15 that is formed by the piston rod 10, the cylinder head 12, and the piston 8, driving the piston rod 10 in.

A piston seal labeled 16 overall is provided on the piston 8 between the cylinder space 14 and the piston rod-side cylinder space 15. Correspondingly, a rod seal labeled 17 overall is provided on the cylinder head 12 between the external area of the cylinder unit 5 and the piston rod-side cylinder space 15.

Figure 2:
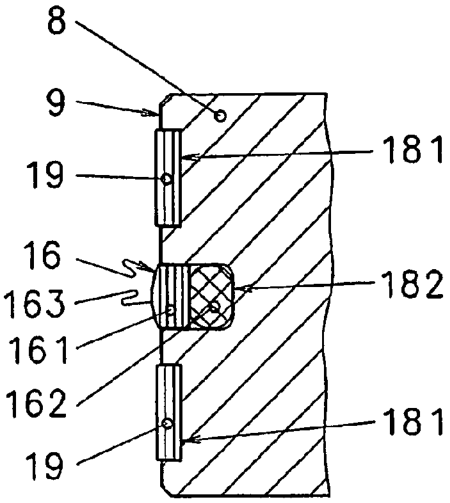
FIG. 2 is detail II in accordance with FIG. 1, using a larger scale.

FIG. 2 illustrates the piston seal 16 in greater detail. This piston 8 has three circumferential grooves 181, 182 spaced at intervals from one another on the outer surface 9 of the piston. A guide ring 19 is inserted in each of the two external, outwardly open grooves 181. Provided in the center groove 182 is the seal that is labeled 16 overall and that is arranged from two parts, specifically the piston seal 161 embodied as a sliding and sealing element and the pre-stress element 162 arranged thereunder, e.g. in the form of an elastomer ring that when installed assures that the sliding and sealing element 161 exerts a certain basic pressure against the cylinder's inner surface 7.

Figure 4:
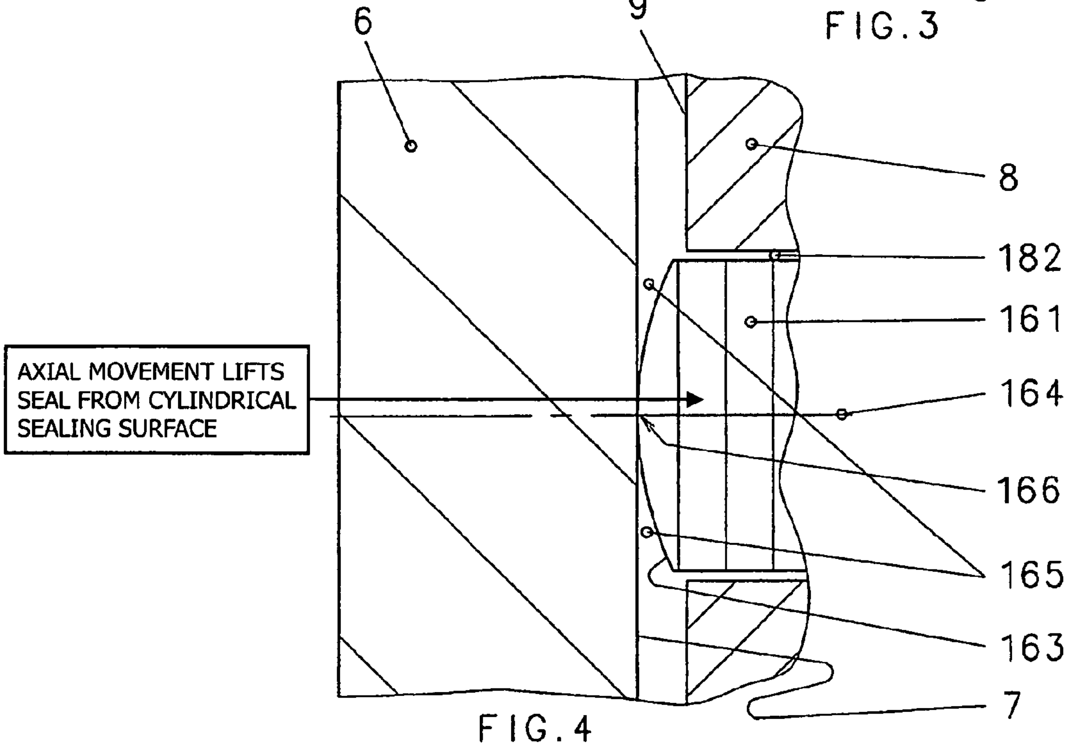
FIG. 4 is FIG. 2 using a larger scale.

The piston seal 161 has an outer seal surface 163 that is symmetrically embodied with respect to the center plane 164 (FIG. 4) of the piston seal 161, while forming with respect to the inner cylinder surface 7 of the cylinder tube 6 two converging gaps 165 (FIG. 4), deviating from the surface of a vertical circular cylinder. The highest point and at the same time the longest circumferential, closed line of contact, the outer equator 166, between the seal outer surface 163 and the inner surface 7 of the cylinder tube 6 is located in the region of the center plane. 164. Thus, as the distance from the outer equator 166 to the two gaps 165 that converge in the direction of this outer equator 166 decreases, the free cross-section of the gaps for the passage of the displaced hydraulic fluid grows increasingly smaller. In the exemplary embodiment depicted, the region that is adjacent to the gap 165 and that deviates from the shape of the surface of a vertical circular cylinder is embodied in a wedge-shape with curvature in the axial direction. The wedge-shaped gap 165 between the outer seal surface 163 and the inner cylinder surface 7 of the cylinder tube 6 results in a hydrodynamic effect such that the piston seal 161 lifts from the hydraulic fluid carried into the wedge-shaped gap 165 over the highest point, the outer equator 166, that is, the seal outer surface 163, which is overall ball-shaped, lifts from the inner cylinder surface 7 of the cylinder tube 6. This substantially reduces the mechanical frictional forces of the seal. FIG. 4 depicts this part of the piston 8 from FIG. 2 in greater detail.

Figure 3:
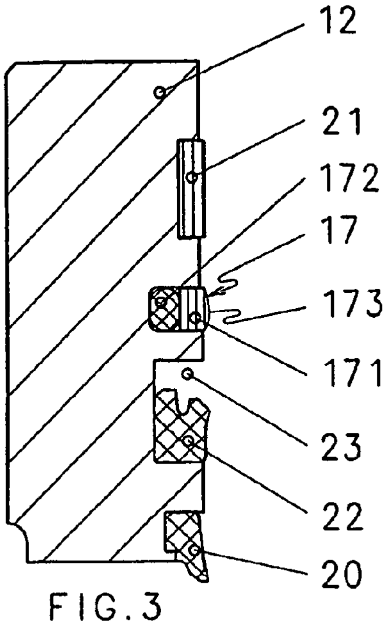
FIG. 3 is detail III in accordance with FIG. 1, using a larger scale.

The rod seal, labeled 17 overall, that is inserted in the cylinder head 12, is illustrated in greater detail in FIG. 3. In interiorly situated circumferential grooves that are spaced at intervals from one another, a wiping element 20 is provided in the outermost groove and a rod guide 21 is provided in the groove next closest to the piston rod-side cylinder space 15. The rod seal 17 is likewise provided in two parts, with a seal 171 embodied as a sliding and sealing element and with a pre-stress element 172 located thereunder that corresponds to the element 162 already discussed in accordance with FIG. 2.

Deviating from the piston seal 161, the inner seal surface 173 of the rod seal 171 is embodied asymmetrical with respect to the center plane and has either only one wedge-shaped gap or two gaps with different gap angles and/or length. In the former case the gap is preferably open to the piston rod-side cylinder space 15.

An additional seal labeled 22 overall is arranged between the rod seal 171 and the outer area of the cylinder unit. Arranged between the latter and the rod seal 171 is a recess 23 in the cylinder head that acts as a reservoir for the hydraulic fluid, in which recess is collected hydraulic fluid that is carried out as a lubricating film under the rod seal 171 during the outward stroke of the piston rod. During the subsequent inward stroke of the piston, this quantity of oil can be carried with its piston rod using the return ability of the rod seal back into the rod-side cylinder space 15.

The asymmetrical shape of the seal inner wall 173 is provided in order to promote the return using the rod seal 171, this shape ensuring the return of the quantity of hydraulic fluid previously carried out.

The piston seal and the rod seal may be comprised of a polyurethane or a dimensionally stable material, such as polytetrafluoroethylene, polyamide, polyethylene or polyoxymethylene. These polymers may be admixed with a filler, such as subdivided (e.g., particulate or powdered) bronze or graphite, before being fabricated into the seals.

The invention claimed is:

1. A hydraulic cylinder unit, comprising:

a cylinder tube presenting an inner surface;

a piston received within said cylinder tube and which is guided on said inner surface, said piston including an outer surface, each of said inner surface of said cylinder tube and said outer surface of said piston being configured as an axially extended cylinder;

a cylinder head and a cylinder floor spaced apart from one another, said cylinder head and said cylinder floor being connected to said cylinder tube;

a piston rod joined to said piston, said piston rod including a rod surface, configured as an axially extended cylinder, which is guided in said cylinder head and that together with said piston encloses a piston rod-side cylinder space;

at least one rod seal disposed in said cylinder head which presents a rotationally symmetrical inner seal surface operable to seal said piston rod-side cylinder space from an area of said cylinder unit between said rod surface and said cylinder head; and at least one piston seal disposed about said piston that seals said piston-rod side cylinder space and an other cylinder space bounded by the cylinder floor and said piston, said at least one piston seal between said inner surface and said outer surface of said piston by means of a rotationally symmetrical outer seal surface;

said at least one rod seal and/or said at least one piston seal each being configured as a hydrodynamic seal having a respective seal surface which includes a shape that deviates from a sealing surface of a respective one said circular cylinder facing said seal surface, so as to form at least one axially converging gap with respect to said sealing surface, said hydrodynamic seal being structurally adapted to lift from contact with the sealing surface when said piston and said piston rod are moved axially relative to said cylinder tube, thereby reducing mechanical frictional forces therebetween.

2. A hydraulic cylinder unit according to claim 1, wherein, in addition to a curvature in a circumferential direction due the rotational symmetry of the hydrodynamic seal, said hydrodynamic seal is also curved in the axial direction.

3. A hydraulic cylinder unit according to claim 1, wherein said hydrodynamic seal, without additional curvature in the axial direction, forms a wedge-shaped gap that has a shape that deviates from the sealing surface of the circular cylinder and which comprises said at least one axially converging gap.

4. A hydraulic cylinder unit according to claim 1, wherein said at least one piston seal includes two gaps that deviate from the corresponding sealing surface of the circular cylinder, of which said one is open to said other cylinder space and an other is open to said rod-side cylinder space.

5. A hydraulic cylinder unit according to claim 4, wherein said piston seal is symmetrical with respect to an axial center plane thereof

6. A hydraulic cylinder unit according to claim 1, wherein said gap of said rod seal is asymmetrical with respect to an axial center plane thereof and said gap is open to said piston rod-side cylinder space.

7. A hydraulic cylinder unit according to claim 6, further comprising an additional seal being arranged between said rod seal and said area of said cylinder unit between said rod surface and said cylinder head.

8. A hydraulic cylinder unit according to claim 7, wherein, arranged in said cylinder head between said rod seal and said additional seal, is a recess acting as a reservoir for hydraulic fluid.

9. A hydraulic cylinder unit according to claim 8, wherein:

said rod seal includes another gap;

said two gaps are asymmetrical with respect to said axial center plane; and said additional gap is open to said recess in said cylinder head that acts as the reservoir for the hydraulic fluid.

10. A hydraulic cylinder unit according to claim 1, wherein said hydrodynamic seal comprises polyurethane or another dimensionally stable material.

11. A hydraulic cylinder unit according to claim 10, wherein the dimensionally stable material comprises polytetrafluoroethylene, polyamide, polyethylene or polyoxymethylene.

12. A hydraulic cylinder unit according to claim 1, wherein the hydrodynamic seal further comprises a filler.

13. A hydraulic cylinder unit according to claim 12, wherein the filler comprises subdivided bronze or graphite.

14. A hydraulic cylinder unit according to claim 1, further comprising a pre-stress element arranged under said hydrodynamic seal.

* * * * *